C. LE G. FORTESCUE.
SYSTEM OF DISTRIBUTION.
APPLICATION FILED OCT. 7, 1915.

1,201,032.

Patented Oct. 10, 1916.

WITNESSES:
Fred H Miller
J H Procter

INVENTOR
Charles LeG Fortescue
BY
Wesley G Carr
ATTORNEY

UNITED STATES PATENT OFFICE.

CHARLES LE G. FORTESCUE, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF DISTRIBUTION.

1,201,032.    Specification of Letters Patent.    Patented Oct. 10, 1916.

Application filed October 7, 1915. Serial No. 54,588.

*To all whom it may concern:*

Be it known that I, CHARLES LE G. FORTESCUE, a subject of the King of England, and a resident of Pittsburgh, in the county of Allegheny and State of Pennsylvania, have invented a new and useful Improvement in Systems of Distribution, of which the following is a specification.

My invention relates to systems of electrical distribution, and particularly to systems of the kind in which a direct-current circuit, such as an electric railway circuit, is supplied with energy from an alternating-current circuit through a vapor converter or another suitable current-rectifying device.

The object of my invention is to provide a system of the above-indicated character in which the supply of energy to the direct-current circuit may be interrupted, upon the occurrence of an abnormal condition therein, without injury to the system or the apparatus associated therewith.

Difficulty has usually been experienced in the interruption of the circuits of high-voltage direct-current electric railways, because such circuits are usually highly inductive and no means have ordinarily been provided for successfully dissipating the energy stored in the circuits, the discharge of which often damages the insulation.

According to the present invention, this difficulty is avoided by placing the automatic circuit breakers in the alternating-current circuit rather than in the direct-current circuit, and by controlling them in accordance with the conditions existing in the direct-current circuit.

Figure 1:
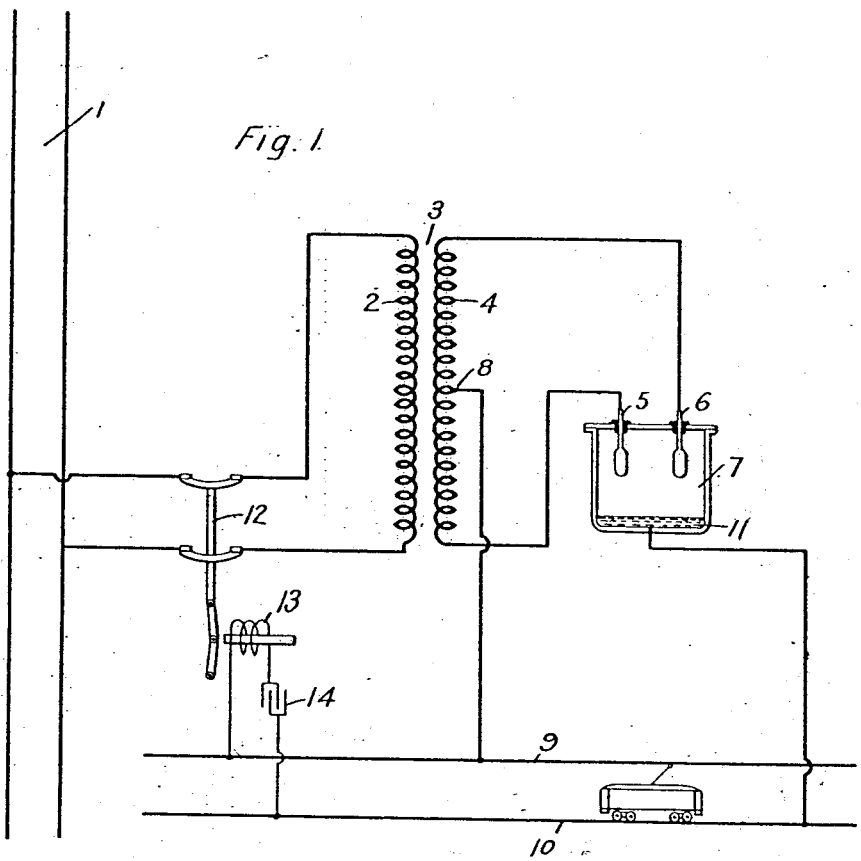
Figure 2:
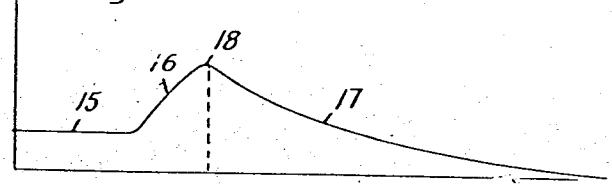

Figure 1 of the accompanying drawing is a diagrammatic illustration of a system of distribution that embodies my invention, and Fig. 2 is a curve representing the variations in current in the direct-current circuit of the system when the circuit breaker is opened.

The present system comprises an alternating-current circuit 1 from which current is supplied to the primary winding 2 of a transformer 3, the terminals of the secondary winding 4 of which are respectively connected to the anodes 5 and 6 of a vapor converter 7, and the middle or another suitable intermediate point 3 of which is connected to one conductor 9 of an electric railway, the other conductor 10 of which is connected to the cathode 11 of the vapor converter. The circuit 9—10 thus receives direct current through the transformer 3 and the converter 7.

Instead of providing a circuit breaker in the direct-current side of the system which is automatically tripped upon the occurrence of a ground or short circuit or other abnormal condition in the direct-current railway circuit, a circuit breaker 12 is employed between the alternating-current circuit 1 and the primary winding 2 of the transformer 3, and this circuit breaker is arranged to be tripped upon the occurrence of an abnormal condition in the direct-current railway circuit 9—10. The tripping mechanism of the circuit breaker comprises an actuating coil 13 that is connected in series with a condenser 14 between the conductors 9—10 of the railway circuit in substantially the manner set forth in my co-pending application, Serial No. 700,011, filed May 27, 1912.

Upon the occurrence of a short circuit or ground, or other abnormal condition upon the direct-current railway circuit 9—10, the condenser 14 discharges before the power current that traverses the circuit has had time to reach a destructive value. The energy is discharged from the condenser through the coil 13, which thereupon becomes sufficiently energized to trip the circuit breaker 12 and disconnect the transformer 3 from the alternating-current supply circuit 1. The energy stored in the railway circuit 9—10 is then dissipated in the resistance of the circuit, in the secondary winding 4 of the transformer 3, and in the converter 7, without damaging the insulation of the direct-current circuit or the apparatus connected to it. This will be best understood by a consideration of Fig. 2 in which the straight portion 15 of the curve represents the normal current in the circuit 9—10, the portion 16 represents the increase in current following a short circuit, which increase continues for something less than a half cycle, and the part 17 represents the diminishing value of the current following the opening of the circuit breaker. The point 18 represents the maximum value to which the current rises prior to the opening of the circuit breaker. It will be observed that the current does not have time to rise to an excessive value, and that the energy of the circuit is gradually dissipated, as a result of which the insulation of the direct-current circuit 9—10 is relieved from liability to damage caused by excessive voltages.

It will be understood that other kinds and forms of current-rectifying devices may be employed in place of the vapor converter 7, and that other means for tripping the circuit breaker may be employed, as well as that many other modifications of the system may be made without departing from the spirit and scope of the invention.

I claim as my invention:

1. An electrical distribution system comprising an alternating-current circuit, a direct-current circuit, rectifying means connected therebetween, and means for interrupting the connection between the alternating-current circuit and the rectifying means only, in response to conditions of the direct-current circuit.

2. An electrical distribution system comprising an alternating-current circuit, a direct-current circuit that receives power therefrom, and means for interrupting the alternating-current circuit only, in response to conditions in the direct-current circuit.

3. An electrical distribution system comprising an alternating-current circuit, a direct-current circuit, a vapor rectifier connected therebetween, a circuit interrupter for the alternating-current circuit only, and electro-responsive means operatively connected to the direct-current circuit for tripping the circuit interrupter under predetermined conditions in the direct-current circuit.

4. An electrical distribution system comprising an alternating-current circuit, a direct-current circuit, a converter connected therebetween, a circuit interrupter for the alternating-current circuit only, and means for tripping the circuit interrupter in response to predetermined conditions in the direct-current circuit.

5. In an electrical distribution system, the combination with an alternating-current circuit, a direct-current circuit, a converter, and a transformer operatively connected between the converter and the alternating-current circuit, of means for interrupting the alternating-current circuit side of the transformer under predetermined conditions in the direct-current circuit.

6. In a system of distribution, the combination with an alternating-current circuit, a direct-current circuit and a converter, and a transformer connected therebetween, of a circuit interrupter for interrupting the alternating-current circuit side of the transformer in response to conditions in the direct-current circuit.

7. In a system of distribution, the combination with an alternating-current circuit, a direct-current circuit and a converter connected therebetween, of means for interrupting the alternating-current circuit only, in response to conditions in the direct-current circuit.

8. In a system of distribution, the combination with an alternating-current circuit, a direct-current circuit and a converter and a transformer connected therebetween, of means for interrupting the connection between the alternating-current circuit and the transformer in response to predetermined conditions in the direct-current circuit.

9. In a system of distribution, the combination with an alternating-current circuit, a direct-current circuit and a converter and a transformer connected therebetween, of means for interrupting the connection between the alternating-current circuit and the transformer only, in response to predetermined conditions in the direct-current circuit.

10. In a system of distribution, the combination with an alternating-current circuit, a direct-current circuit and a converter connected therebetween, of means for disconnecting the converter only from the alternating-current circuit when an overload traverses the direct-current circuit.

11. In a system of distribution, the combination with an alternating-current circuit, a direct-current circuit and a converter connected therebetween, of a circuit interrupter connected between the converter and the alternating-current circuit and adapted to be tripped when an overload traverses the direct-current circuit to thereby permit the energy of the direct-current circuit to be dissipated in the converter and in the direct-current circuit.

12. An electrical distribution system comprising an alternating-current circuit, a direct-current circuit that receives energy therefrom and means for so interrupting the alternating-current circuit when an overload traverses the direct-current circuit that the energy in the direct-current circuit will be dissipated within itself.

13. In a system of distribution, the combination with an alternating-current circuit and a direct-current circuit, of a transformer the primary winding of which is connected to the alternating-current circuit, a converter operatively connected to the direct-current circuit and the secondary winding of the transformer, and means for interrupting the primary winding of the transformer in response to predetermined conditions in the direct-current circuit.

14. In a system of distribution, the combination with an alternating-current circuit and a direct-current circuit, of a transformer the primary winding of which is connected to the alternating-current circuit, a converter operatively connected to the direct-current circuit and the secondary winding of the transformer, and means for interrupting the primary winding of the transformer in anticipation of predetermined conditions in the direct-current circuit.

In testimony whereof, I have hereunto subscribed my name this 29th day of Sept. 1915.

CHARLES LE G. FORTESCUE.